(12) United States Patent
Gere et al.

(10) Patent No.: US 11,493,606 B1
(45) Date of Patent: Nov. 8, 2022

(54) MULTI-BEAM SCANNING SYSTEM

(71) Applicant: Apple Inc., Cupertino, CA (US)

(72) Inventors: David S. Gere, Palo Alto, CA (US);
Brad V. Johnson, Santa Clara, CA (US); Neil MacKinnon, San Jose, CA (US); Scott T. Smith, San Jose, CA (US); Seyedeh Nasim Habibi, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 745 days.

(21) Appl. No.: 16/537,581

(22) Filed: Aug. 11, 2019

Related U.S. Application Data

(60) Provisional application No. 62/730,026, filed on Sep. 12, 2018.

(51) Int. Cl.
*G02B 27/10* (2006.01)
*G01S 7/481* (2006.01)
(Continued)

(52) U.S. Cl.
CPC .......... *G01S 7/4817* (2013.01); *G01S 7/4815* (2013.01); *G01S 17/08* (2013.01); *G01S 17/89* (2013.01);
(Continued)

(58) Field of Classification Search
CPC ...... G01S 7/4817; G01S 7/4815; G01S 17/08; G01S 17/89; G02B 26/0816;
(Continued)

(56) References Cited

U.S. PATENT DOCUMENTS

| 5,552,893 A | 9/1996 | Akasu |
| 5,646,928 A | 7/1997 | Wu et al. |

(Continued)

FOREIGN PATENT DOCUMENTS

| DE | 102011001387 A1 | 9/2012 |
| EP | 2827175 A2 | 1/2015 |

(Continued)

OTHER PUBLICATIONS

Montrose Laboratories LLC., PCT Application # PCT/US2017/066919 filed Dec. 12, 2017.

(Continued)

*Primary Examiner* — Euncha P Cherry
(74) *Attorney, Agent, or Firm* — Kligler & Associates Patent Attorneys Ltd

(57) ABSTRACT

Optical apparatus includes a plurality of emitters arranged in a row and configured to emit respective beams of optical radiation. Projection optics, which are configured to project the beams toward a target, include first cylindrical lenses, which have respective, mutually-parallel first cylinder axes and are aligned respectively with the emitters in the row so as to receive and focus the respective beams in a first dimension, and a second cylindrical lens, which has a second cylinder axis perpendicular to the first cylinder axes and is positioned to receive and focus all of the beams in a second dimension, perpendicular to the first dimension. A scan driver is configured to shift the second cylindrical lens in a direction perpendicular to the second cylinder axis so as to scan the beams across the target.

11 Claims, 4 Drawing Sheets

(51) Int. Cl.
  *G02B 26/08*   (2006.01)
  *G02B 26/10*   (2006.01)
  *G02B 26/12*   (2006.01)
  *G02B 27/09*   (2006.01)
  *G01S 17/89*   (2020.01)
  *G01S 17/08*   (2006.01)

(52) U.S. Cl.
  CPC ..... *G02B 26/0816* (2013.01); *G02B 26/0875* (2013.01); *G02B 26/101* (2013.01); *G02B 26/123* (2013.01); *G02B 26/124* (2013.01); *G02B 26/125* (2013.01); *G02B 27/0922* (2013.01); *G02B 27/0944* (2013.01)

(58) Field of Classification Search
  CPC .......................... G02B 26/0875; G02B 26/101; G02B 26/123; G02B 26/124; G02B 26/125; G02B 27/0922; G02B 27/0944; G02B 27/0905; G02B 27/10
  USPC ......................................................... 359/619
  See application file for complete search history.

(56) References Cited

U.S. PATENT DOCUMENTS

| | | | |
|---|---|---|---|
| 5,883,746 | A | 3/1999 | Zelenka |
| 6,043,104 | A | 3/2000 | Uchida |
| 6,624,919 | B2 | 9/2003 | Lambert |
| 7,133,022 | B2 | 11/2006 | Grabert |
| 7,544,945 | B2 | 6/2009 | Tan et al. |
| 9,400,177 | B2 | 7/2016 | Pesach |
| 9,553,423 | B2 | 1/2017 | Chen et al. |
| 9,736,459 | B2 | 8/2017 | Mor et al. |
| 9,880,265 | B2 | 1/2018 | Schneider et al. |
| 9,885,778 | B2 | 2/2018 | Dussan |
| 9,997,551 | B2 | 6/2018 | Mandai et al. |
| 10,063,835 | B2 | 8/2018 | Mor et al. |
| 10,447,424 | B2 | 10/2019 | MacKinnon |
| 10,877,285 | B2 * | 12/2020 | MacKinnon ......... G02B 27/141 |
| 2005/0178950 | A1 | 8/2005 | Yoshida |
| 2007/0242254 | A1 | 10/2007 | Nagasaka |
| 2009/0016710 | A1 | 1/2009 | Nozaki et al. |
| 2011/0007240 | A1 | 1/2011 | Qu et al. |
| 2011/0187878 | A1 | 8/2011 | Mor et al. |
| 2012/0057134 | A1 | 3/2012 | Huang |
| 2012/0140184 | A1 | 6/2012 | Bruzzone |
| 2013/0182227 | A1 | 7/2013 | Schuck |
| 2015/0077645 | A1 | 3/2015 | Lin |
| 2015/0098128 | A1 | 4/2015 | Carls et al. |
| 2015/0131080 | A1 | 5/2015 | Retterath et al. |
| 2016/0161752 | A1 | 6/2016 | Negoita et al. |
| 2016/0373704 | A1 | 12/2016 | Akiyama |
| 2017/0052065 | A1 | 2/2017 | Sharma et al. |
| 2017/0146803 | A1 | 5/2017 | Kishigami et al. |
| 2017/0176579 | A1 | 6/2017 | Niclass et al. |
| 2017/0219695 | A1 | 8/2017 | Hall et al. |
| 2017/0242100 | A1 | 8/2017 | Hinokuma et al. |
| 2018/0062345 | A1 | 3/2018 | Bills et al. |
| 2018/0073863 | A1 | 3/2018 | Watanabe |
| 2018/0084241 | A1 | 3/2018 | Chen et al. |
| 2019/0107728 | A1 | 4/2019 | Kim |
| 2019/0222346 | A1 | 7/2019 | MacKinnon |
| 2019/0335147 | A1 | 10/2019 | Miura |

FOREIGN PATENT DOCUMENTS

| | | |
|---|---|---|
| WO | 2010068974 A1 | 6/2010 |
| WO | 2013062932 A1 | 5/2013 |
| WO | 2014093085 A1 | 6/2014 |
| WO | 2015199615 A1 | 12/2015 |

OTHER PUBLICATIONS

Charbon et al., "SPAD-Based Sensors", TOF Range-Imaging Cameras, Springer-Verlag Bedin Heidelberg, pp. 11-38, 2013.
U.S. Appl. No. 16/544,972 office action dated Oct. 1, 2019.
U.S. Appl. No. 16/045,779 office action dated Oct. 10, 2019.
CN Application #201880086307.4 Office Action dated Sep. 3, 2021.

* cited by examiner

MULTI-BEAM SCANNING SYSTEM

CROSS-REFERENCE TO RELATED APPLICATION

This application claims the benefit of U.S. Provisional Patent Application 62/730,026, filed Sep. 12, 2018, which is incorporated herein by reference.

FIELD OF THE INVENTION

The present invention relates generally to optical systems, and particularly to systems and methods for optical scanning and depth mapping.

BACKGROUND

Existing and emerging consumer applications have created an increasing need for real-time three-dimensional (3D) imagers. These imaging devices, also commonly known as depth sensors or depth mappers, enable the remote measurement of distance (and often intensity) of each point on a target scene—so-called target scene depth—by illuminating the target scene with one or more optical beams and analyzing the reflected optical signal.

A commonly used technique for determining the distance to each point on the target scene involves transmitting a pulsed optical beam towards the target scene, followed by the measurement of the round-trip time, i.e. time-of-flight (ToF), taken by the optical beam as it travels from the source to target scene and back to a detector adjacent to the source.

Another commonly used technique is based on projecting a pattern of structured light onto a scene and capturing an image of the projected pattern. The distance to each point in the scene is derived by triangulation from the local displacement of the pattern.

Some depth mapping systems scan multiple beams concurrently across a scene, and detect reflections of the multiple beams in order to generate the depth map. For example, U.S. Patent Application Publication 2018/0062345, whose disclosure is incorporated herein by reference, describes an optical apparatus that includes an array of lasers, which are arranged in a grid pattern having a predefined spatial pitch and are configured to emit respective beams of pulses of optical radiation. Projection optics having a selected focal length project the beams toward a target with an angular pitch between the beams defined by the spatial pitch and the focal length. A scanner scans the projected beams over a range of scan angles that is less than twice the angular pitch. In one embodiment, the projection optics comprise a lens, and the scanner is configured to scan the projected beams by translating the lens transversely with respect to the beams. Control circuitry drives the lasers and the scanner so that the pulses cover the target with a resolution finer than the angular pitch. A receiver receives and measures a time of flight of the pulses reflected from the target.

SUMMARY

Embodiments of the present invention that are described hereinbelow provide improved devices and methods for scanning and projection of optical beams.

There is therefore provided, in accordance with an embodiment of the invention, optical apparatus, including a plurality of emitters arranged in a row and configured to emit respective beams of optical radiation. Projection optics are configured to project the beams toward a target, and include first cylindrical lenses, which have respective, mutually-parallel first cylinder axes and are aligned respectively with the emitters in the row so as to receive and focus the respective beams in a first dimension. A second cylindrical lens, which has a second cylinder axis perpendicular to the first cylinder axes, is positioned to receive and focus all of the beams in a second dimension, perpendicular to the first dimension. A scan driver is configured to shift the second cylindrical lens in a direction perpendicular to the second cylinder axis so as to scan the beams across the target.

In some embodiments, the beams emitted by the emitters have an elliptical profile, with a major axis oriented parallel to the first cylinder axes, and the first cylindrical lenses are positioned in proximity to the emitters, while the second cylindrical lens is positioned so as to receive the beams after the beams have passed through the first cylindrical lenses. In a disclosed embodiment, the emitters include edge-emitting laser diodes.

In some embodiments, the projection optics include a beam deflector, which is configured to intercept the beams that have been focused by the first and second cylindrical lenses and to deflect the beams toward the target at different, respective angles. In one embodiment, the beam deflector includes a reflector having multiple facets, which are positioned to intercept respective ones of the beams and which are parallel to the second cylinder axis and oriented at different respective elevations relative to the first cylinder axes.

Additionally or alternatively, the projection optics include a unidimensional beam expander, which is configured to expand each of the deflected beams along the first dimension so as to form a set of parallel stripes extending across the target at the different, respective angles. In one embodiment, the unidimensional beam expander includes a diffractive optical element (DOE). Typically, operation of the scan driver causes the stripes to scan together across the target along the second dimension.

In a disclosed embodiment, the apparatus includes a receiver, which includes an array of optical sensors, and objective optics, which are configured to image the target onto the array, and which have a non-circular aperture, which is elongated along the second dimension. The apparatus may also include control circuitry, which is configured to generate a depth map of the target responsively to signals output by the array of optical sensors in response to reflection of the beams of optical radiation from the target.

In another embodiment, the apparatus includes a detector, which is configured to receive a portion of at least one of the beams that has been focused by the first and second cylindrical lenses and to sense a position of the at least one of the beams. Control circuitry is configured to control the scan driver responsively to position sensed by the detector.

There is also provided, in accordance with an embodiment of the invention, optical apparatus, including a projector, which is configured to direct a pattern of one or more stripes, extending along a longitudinal dimension across a target. A receiver includes an array of optical sensors, and objective optics, which are configured to image the target onto the array, and which have a non-circular aperture, which is elongated in a direction dependent upon the longitudinal dimension of the stripes.

In a disclosed embodiment, the non-circular aperture of the objective optics is elongated in a direction perpendicular to the longitudinal dimension of the stripes.

Additionally or alternatively, the apparatus includes control circuitry, which is configured to generate a depth map of the target responsively to signals output by the array of optical sensors in response to reflection of the beams of optical radiation from the target.

There is additionally provided, in accordance with an embodiment of the invention, optical apparatus, including a plurality of emitters arranged in a row and configured to emit respective beams of optical radiation. Projection optics are configured to project the beams toward a target, and include first cylindrical lenses, which have respective, mutually-parallel first cylinder axes and are aligned respectively with the emitters in the row so as to receive and focus the respective beams in a first dimension. A second cylindrical lens, which has a second cylinder axis perpendicular to the first cylinder axes, is positioned to receive and focus all of the beams in a second dimension, perpendicular to the first dimension. A receiver includes an array of optical sensors and objective optics, which are configured to image the target onto the array, and which have a non-circular aperture, which is elongated along the second dimension.

There is further provided, in accordance with an embodiment of the invention, a method for optical projection, which includes providing a plurality of emitters arranged in a row and configured to emit respective beams of optical radiation. First cylindrical lenses, which have respective, mutually-parallel first cylinder axes, are aligned respectively with the emitters in the row so as to receive and focus the respective beams in a first dimension. A second cylindrical lens, which has a second cylinder axis perpendicular to the first cylinder axes, is aligned to receive and focus all of the beams in a second dimension, perpendicular to the first dimension so as to project the beams toward a target. The second cylindrical lens is shifted in a direction perpendicular to the second cylinder axis so as to scan the beams across the target.

The present invention will be more fully understood from the following detailed description of the embodiments thereof, taken together with the drawings in which:

DETAILED DESCRIPTION OF EMBODIMENTS

Overview

Figure 1:
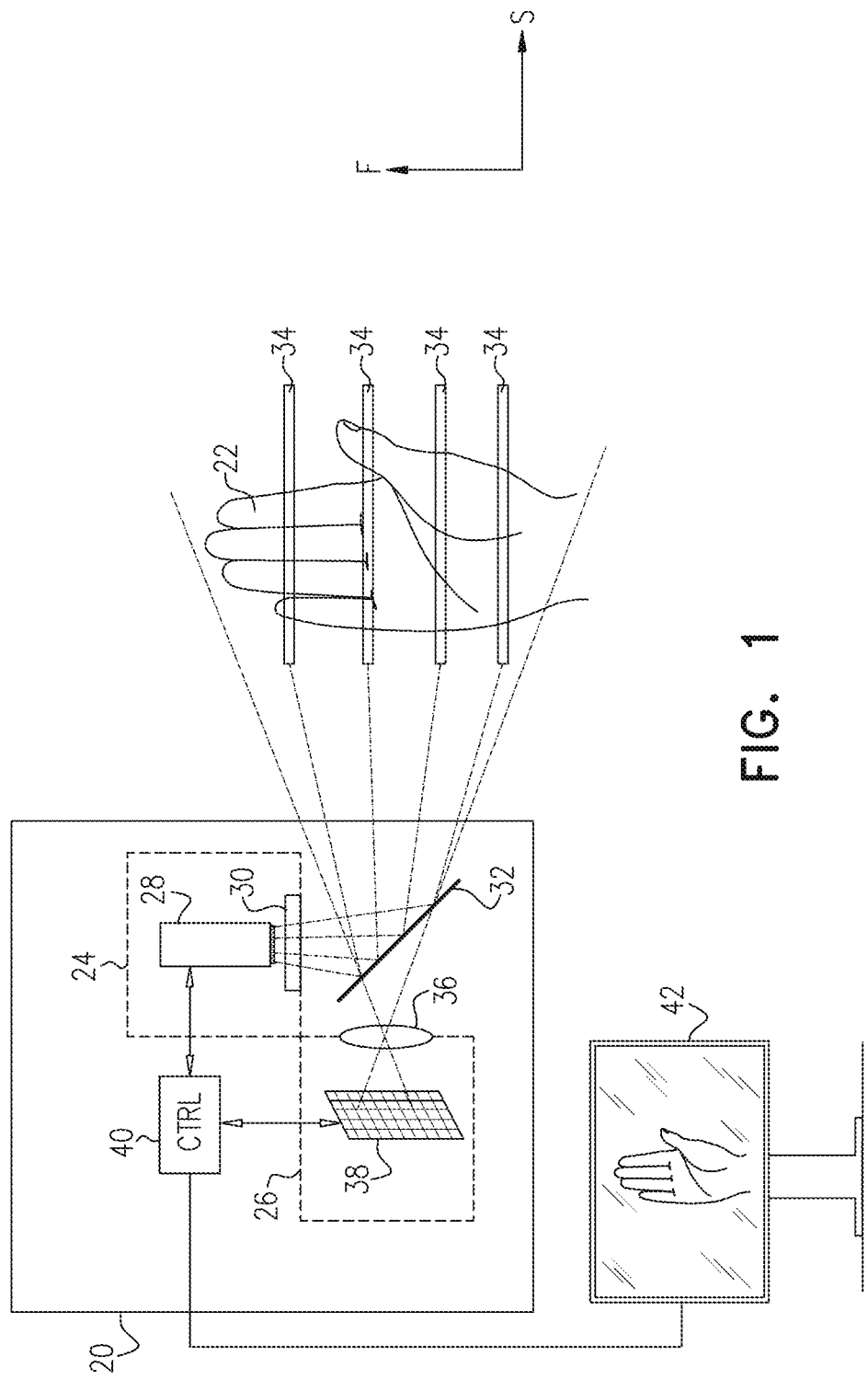
FIG. 1 is a block diagram that schematically illustrates a system for depth mapping, in accordance with an embodiment of the invention.

In some depth mapping applications, a pattern of optical radiation is scanned across a target, such as a scene or object of interest. The radiation that is reflected back from the target is imaged onto an optical sensor (or sensor array), and the resulting signals are processed in order to generate a depth map. The use of a pattern, rather than a single spot, of radiation is advantageous in increasing the mapping throughput, since it enables the depth of multiple points on the target to be measured simultaneously, using different elements of a sensor array, for example. This patterned-radiation approach can be used in both structured light (triangulation) and ToF-based mapping approaches.

Some embodiments of the present invention that are described herein provide apparatus and methods for scanning pattern projection that are advantageous in enabling generation of precise, well-controlled patterns over a large field of view, using a simple, compact, low-cost projector. These patterns are useful particularly, although not exclusively, in depth mapping applications. The embodiments described below relate specifically to patterns comprising multiple, parallel stripes, but the principles of the present invention may be applied, mutatis mutandis, in generating and scanning patterns of spots or other shapes.

In the disclosed embodiments, a projector comprises a row of emitters, which emit optical radiation. (The term "optical radiation," as used in the context of the present description and in the claims, refers to electromagnetic radiation in the visible, infrared, or ultraviolet range of the spectrum.) The beams are projected toward a target by projection optics comprising cylindrical lenses in two different orientations: A first set of cylindrical lenses, with mutually-parallel cylinder axes, are aligned with the emitters in the row, so that each cylindrical lens receives and focuses the respective beam of one of the emitters in a first dimension. A second cylindrical lens, with its cylinder axis perpendicular to that of the first set of lenses, receives and focuses all of the beams in a second dimension, perpendicular to the first dimension. A scan driver shifts the second cylindrical lens in a direction perpendicular to its cylinder axis, and this displacement of the lens causes the beams to scan across the target.

The term "cylinder axis" is used in the present description and in the claims in the sense in which this term is used in the art, to mean a line running through the cylindrical lens in a direction parallel to the refractive, curved surface of the lens. Thus, for example, the cylinder axis of a cylindrical lens whose surface is curved in the X-Z plane will run in the Y-direction. Each cylindrical lens will focus optical radiation in only a single dimension. Thus, for example, when an optical beam is incident on such a cylindrical lens along the Z-direction, the lens will focus the beam in the X-dimension, but not in the Y-dimension.

The use of cylindrical lenses with their cylinder axes oriented orthogonally in embodiments of the present invention is advantageous in enabling the lens shapes and designs to be optimized separately for the two axes, thus allowing cost and size to be minimized for the desired level of performance. This approach is particularly useful when the beams emitted by the emitters have a non-circular profile, such as the elliptical beams emitted by edge-emitting laser diodes. In this case, the projection optics can be oriented so that the major axes of the emitted beams (known in the art, by virtue of its angular divergence properties, as the "fast axis," while the minor axis is referred to as the "slow axis") are oriented parallel to the cylinder axes of the first set of cylindrical lenses, which are positioned in proximity to the emitters. The second cylindrical lens receives the beams after the beams have passed through the first set of cylindrical lenses. Alternatively, depending on the nature of the output desired, the sequence of correction of the slow or fast axis may be interchanged.

In the embodiments that are described below, the projection optics comprise, additionally, a unidimensional beam expander, such as a suitable diffractive optical element (DOE), which tailors the output energy distribution so as to form a set of corresponding parallel stripes extending across the target. For best system performance, it is desirable (though not strictly necessary) to correct the fast axis of the emitted beams to form the width of the projected laser lines, because the far-field divergence of the laser beam is minimized when the diameter of the waist of the corrected beam is maximized. (Such correction is sometimes referred to as collimation, although strictly speaking, the beams are not fully collimated.) The focal length of the lens that corrects the fast-axis dimension (meaning the second cylindrical lens in the present embodiments) should also be large in order to make the beam waist diameter large. These criteria are satisfied by positioning the first set of cylindrical lenses in proximity to the emitters, followed by the second cylindrical lens, as noted above. In this configuration, for example, the second cylindrical lens can be designed to optimize beam divergence, while lens cost can be minimized for the lenses in the first set.

In some embodiments of the present invention, the projection optics comprise a static beam deflector such as an angled mirror, which intercepts the beams that have been corrected by the cylindrical lenses and deflects the beams toward the target at different, respective angles. When used in conjunction with the unidimensional beam expander described above, this deflector will form a set of parallel stripes extending across the target at the respective angles of deflection. Operation of the scan driver causes the stripes to scan together across the target along the second dimension, i.e., in a direction parallel to the projection of the fast axis onto the target.

When a row of edge-emitting laser diodes is used, as described above, the cylindrical lenses in the first set should correct the beams along the slow axes with sufficient precision to keep the beams spatially separated, to ensure that the beam deflector applies the proper, different static deflection offset to each beam. The use of the first set of cylindrical lenses, positioned in immediate proximity to the emitters, accommodates this need while minimizing the overall size of the projector. The beam expander then expands each beam into a stripe along the first dimension (parallel to the projection of the slow axis into the target) following deflection of the beams by the beam deflector.

The above arrangement of cylindrical lenses also enables precise correction of all the beams in the fast axis dimension by the single second cylindrical lens (which is also shifted in order to scan the beam, as described above). The width of this cylindrical lens along the second cylinder axis need be only slightly greater than the width of the array of emitters. If rotationally-symmetric lenses were used instead, the diameter of the lens would have to increase in proportion to the width of the emitter array, resulting in a much larger size and mass in comparison with the cylindrical lenses. Furthermore, the use of cylindrical lenses for fast-axis correction keeps most of the optical radiation from any emitter near the optical axis of the lens, thus maximizing performance.

Additionally, the arrangement of a linear array with correction optics and static offsets allows, by simple multiplication of the number of emitters and associated beam deflectors set at suitable angles, a very wide field of illumination to be built up. The cylindrical power of the lenses allows such extension of the linear source array without the difficulties associated with spherical lenses, which require that all the sources be within a single image circle.

For precise control of the scanned beam angles, control circuitry may use beam position feedback in controlling the scan driver. For this purpose, for example, an optical detector can be placed so as to receive a portion of at least one of the beams that has been focused by the cylindrical lenses, such as a small part of the beam energy that passes through the beam deflector mentioned above. The detector senses the position of the incident beam, and the control circuitry applies a driving signal to the scan driver based on the sensed position. Alternatively, non-optical sensing means, such as Hall effect sensors, may be used.

In some embodiments of the present invention, the optical radiation reflected from the target is collected by a receiver, which comprises an array of optical sensors and objective optics, which image the target onto the array. The signals output by the array can be used, for example, in generating a depth map of the target. In this sort of application, it is desirable that the receiver collect as much radiation as possible, with high spatial resolution. The amount of radiation collected by the objective optics depends on the area of the entrance pupil, which in turn depends on the size of the optical aperture of the objective optics. To maximize radiation collection, the area of the aperture should be maximized; but for lenses whose performance is aberration-limited (as is generally the case in compact, inexpensive optical systems), maximizing aperture area generally causes a reduction in the spatial resolution of the image.

These conflicting requirements—maximizing radiation collection while maintaining high spatial resolution—are addressed in some embodiments of the present invention by using objective optics with a non-circular aperture. This approach is useful particularly in situations in which higher spatial resolution is needed in one dimension than another. In the present case, detection with high spatial resolution is needed along the lengths of the stripes, meaning in the "slow" dimension in the example described above, while lower resolution can be tolerated across the stripes, in the "fast" dimension. Specifically, given the projector configuration described above, and assuming the objective optics to be aberration-limited, the aperture can be elongated along the second dimension, meaning the dimension that is parallel to the projection of the fast axis and perpendicular to the projected stripes. (For lenses that are diffraction-limited, rather than aberration-limited, the orientations of the long and short axes of the aperture would be reversed.) The net result is that the lens is optimized for resolution in the first (slow) dimension, in which high resolution is needed, while the area of the aperture is also maximized. Alternatively, the elongated aperture may be rotated so that the lens is optimized for resolution in the fast dimension.

Although these features of the receiver and objective optics are described here in conjunction with a particular type of pattern projector, in alternative embodiments a receiver with non-circular aperture can be used in conjunction with patterns projected by other means, and particular patterns that comprise elongated shapes, such as stripes. All such alternative embodiments are considered to be within the scope of the present invention.

System Description

FIG. 1 is a block diagram that schematically illustrates a system 20 for depth mapping, in accordance with an embodiment of the invention. In the pictured embodiment, system 20 is used to generate depth maps of a scene including a target 22. To generate the depth map, a projector 24 directs a pattern of multiple beams of optical radiation toward target 22, and a receiver 26 outputs signals in response to reflection of the beams of optical radiation from the target. For example, projector 24 may output pulsed beams, and receiver 26 can then measure the ToF of the photons reflected from the target. Alternatively or additionally, receiver 26 may be used in depth mapping based on triangulation of points in the pattern appearing on the target.

Figure 2:
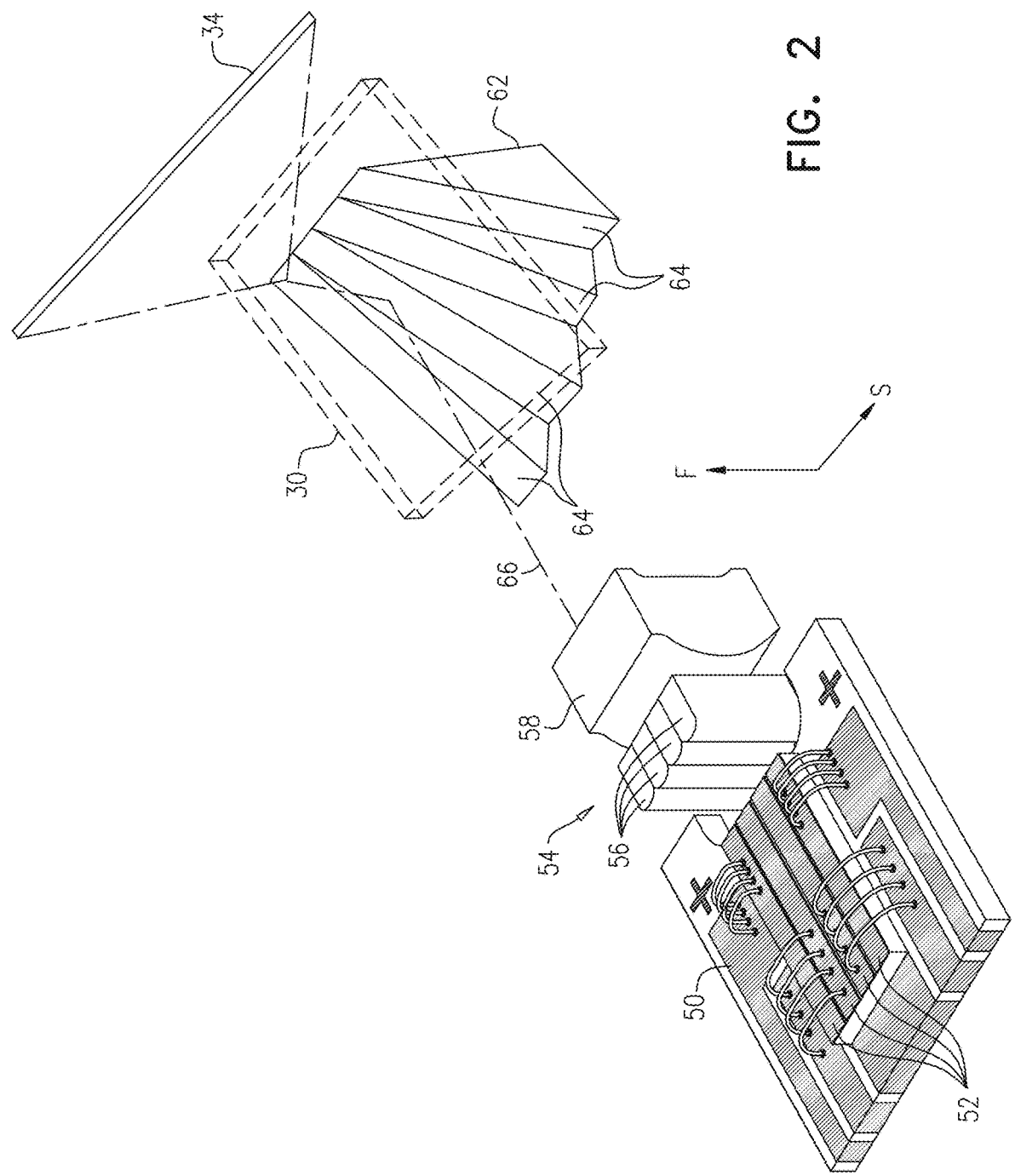
FIG. 2 is a schematic pictorial illustration of a scanning optical projector, in accordance with an embodiment of the invention.
Figure 3:
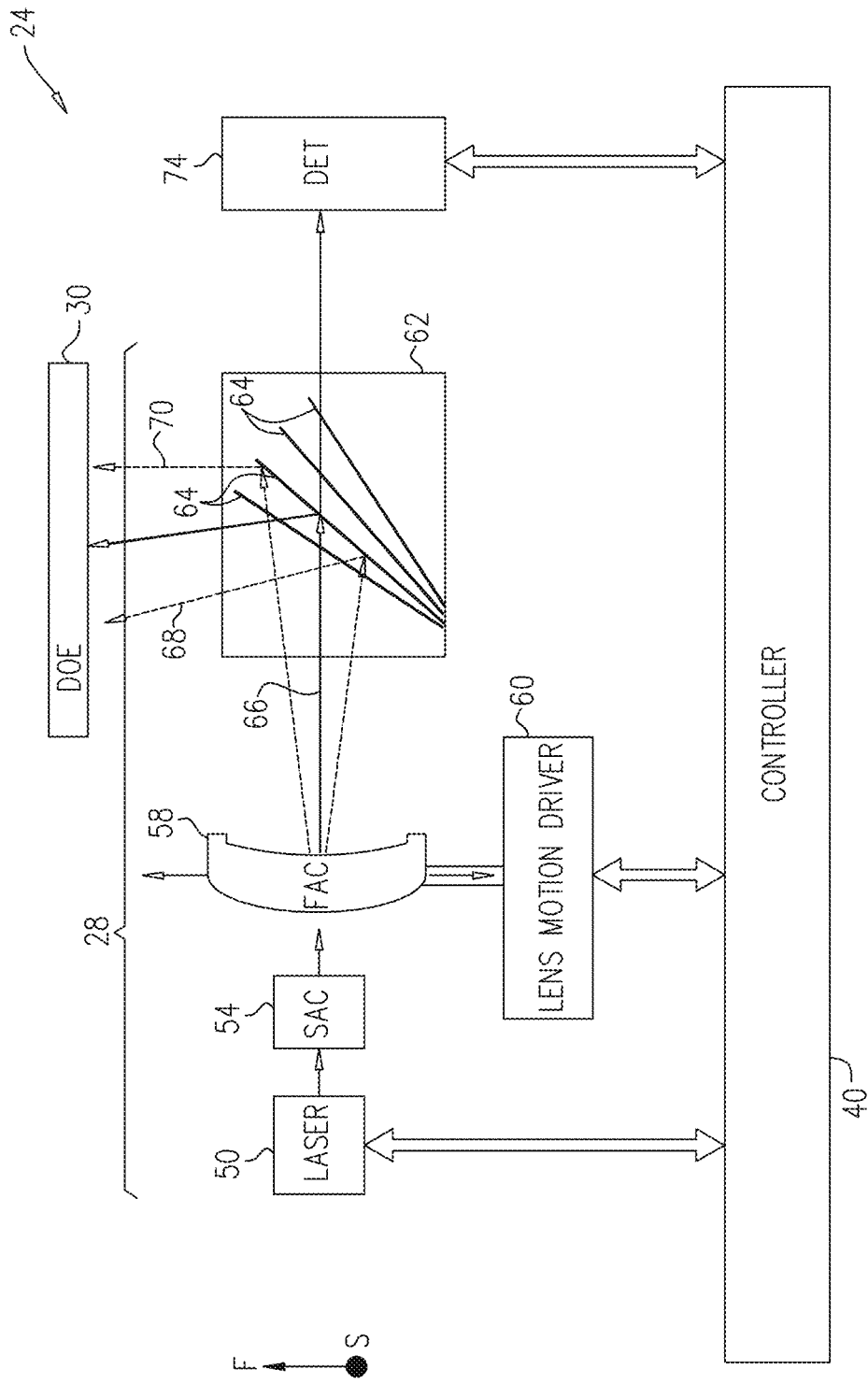
FIG. 3 is a schematic side view of the projector of FIG. 2.

Projector 24 comprises a radiation source 28, which outputs and scans multiple beams of optical radiation, as shown in detail in FIGS. 2 and 3. The beams may be pulsed, as noted above, or continuous-wave (CW). A DOE 30 expands each of the deflected beams so as to form a set of parallel stripes 34 extending longitudinally across the target 22 at different, respective angles. In the pictured example, projector 24 and receiver 26 are coaxial, with a beamsplitter 32 positioned to align the respective optical axes. In an alternative embodiment (not shown in the figures), the axes of projector 24 and receiver 26 may be separate, with both axes directed toward target 22 at a certain offset. Stripes 34 extend along a first dimension, referred to as the slow (S) dimension, as explained above and marked at the right side of FIG. 1. Projector 24 causes the stripes to scan across target in a second, perpendicular direction, referred to as the fast (F) dimension.

Receiver 26 comprises objective optics 36, which image target 22 onto an array 38 of optical sensors, so that photons emitted by projector 24 and reflected from target 22 are incident on the sensors. For ToF measurements, for example, array 38 may comprise high-speed photodetectors, such as avalanche photodiodes or single photon avalanche diodes (SPADs). The photodetectors output signals indicative of the times of incidence of the reflected photons following emission of pulses by projector 24. Receiver 26 outputs digital values of the times of arrival at multiple pixel locations in array 38 to a controller 40, which then generates a depth map, comprising the measured ToF—or equivalently, the measured depth value—at each pixel. The depth map is typically conveyed to a receiving device 42, such as a display or a computer or other processor.

Projector Design

Reference is now made to FIGS. 2 and 3, which schematically show details of projector 24, in accordance with an embodiment of the invention. FIG. 2 is a pictorial illustration, while FIG. 3 is a schematic side view.

Radiation source 28 in projector 24 comprises a laser transmitter 50, which comprises a row of edge-emitting laser diodes 52 on a common substrate. As noted earlier, the beams emitted by laser diodes 52 in this configuration have an elliptical profile, with a major axis oriented perpendicular to the substrate. The direction of the major axis is referred to as the "fast" axis, marked "F" in the figures, while the perpendicular "slow" axis ("S") is parallel to the substrate.

Projection optics 54 in projector 24 correct the divergence of the optical radiation that is output by transmitter 50. (This sort of correction may be informally referred to as "collimation," as noted above.) Projection optics 54 include an array of first cylindrical lenses 56, which are oriented so that their cylinder axes are mutually parallel along the fast axis. Lenses 56 are aligned with the row of laser diodes 52 so that each lens 56 receives and focuses the beam from a respective laser diode in the slow dimension. Although lenses 56 are shown in FIG. 2 as separate elements, in practice the array of lenses 56 may be formed (for example, by molding) as a single piece of material, with multiple, adjacent cylindrical surfaces having respective cylinder axes as described herein. Projection optics 54 further include a second cylindrical lens 58, positioned following the array of lenses 56 and oriented with its cylinder axis along the slow axis (perpendicular to the cylinder axes of first cylindrical lenses 56).

A beam deflector 62 intercepts the beams that have been corrected by projection optics 54 and deflects the beams toward target 22 at different, respective angles. Any suitable sort of deflector may be used for this purpose. In the pictured example, beam deflector 62 comprises a reflector having multiple facets 64, which are positioned so that each facet intercepts a respective one of the corrected beams. Facets 64 are parallel to the slow axis (i.e., parallel to the cylinder axis of lens 58) and oriented at different respective elevations relative to the fast axis, so that each beam is reflected at a different angle. In an alternative embodiment (not shown in the figures), beam deflector 62 comprises multiple light guides, each aligned with one of the corrected beams and having respective end-facets oriented at different angles, so as to reflect the beams outward at different angles by total internal reflection.

In another alternative embodiment, a moving deflector may be used to switch a single laser beam between different segments of the field of view.

A lens motion driver 60 acts as a scan driver, to shift lens 58 in the fast direction (perpendicular to the cylinder axis of lens 58). The displacement of lens 58 in this direction changes the angles of the beams existing the lens, so as to scan the beams across target 22 in the fast dimension. Depending on the required range of movement and scanning speed, driver 60 may comprise, for example, a linear flexure stage, driven by a piezoelectric translator, as is known in the art. Alternatively, driver 60 may comprise an electromechanical actuator. To implement this sort of driver, metal coils can be deposited on the flexure stage, with permanent magnets positioned adjacent to the coils so that they are actuated when current is applied to the coils. Further alternatively, other types of motion devices may be used.

Thus, as illustrated in FIG. 3, each facet 64 of beam deflector 62 reflects a corresponding beam 66 at its own static reflection angle, while motion of lens 58 in the vertical direction scans the beam between a maximal deflection angle 68 and a minimal deflection angle 70 in the fast dimension. As the deflected beams pass through DOE 30, the DOE converts each beam into a stripe, which is elongated along the slow dimension to cover the entire width of the field of view of system 20 (FIG. 1). The static angles of the facets and the scanning range of lens motion driver 60 can be chosen so that each stripe scans over its own segment along the fast dimension, and the union of the scan ranges of stripes 34 covers the entire height of the field of view.

Control circuitry 40 controls lens motion driver 60, as well as the operation of laser transmitter 50. For this purpose, control circuitry 40 typically comprises hardware logic circuits, which may be hard-wired or programmable, with suitable interfaces for outputting signals to transmitter 50 and driver 60 and for receiving input signals from receiver 26 and feedback from other components of system 20. Additionally or alternatively, at least some of the functions of control circuitry may be carried out by a programmable processor, under the control of suitable software or firmware.

To enable control circuitry 40 to monitor and precisely control the operation of laser motion driver 60, a detector 74 receives a portion of at least one of the beams (beam 66 in the example shown in FIG. 3) that has been focused by projection optics 54, and senses the position of the beam (relative to a certain reference position). In the present example, detector 74 receives a part of the beam that has passed through deflector 62. Detector 74 comprises a suitable array of optical sensors, for example, or a position-sensitive detector, and outputs a signal that is indicative of the position at which beam 66 is incident on the detector. This position will change as lens motion driver 60 scans lens 58. Control circuitry 40 processes the signal from detector 74 in order to monitor and control the scan pattern of driver 60.

Receiver Design

Figure 4A:
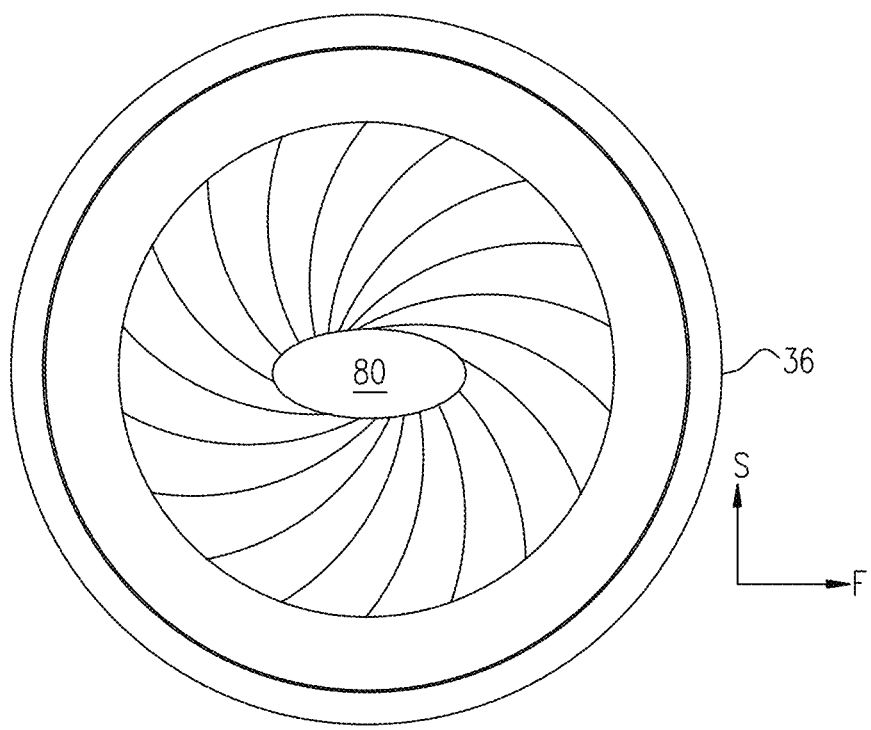
FIG. 4A is a schematic frontal view of an optical aperture of an objective lens, in accordance with an embodiment of the invention.

FIG. 4A is a schematic frontal view of objective lens in receiver, showing an optical aperture 80 of the objective lens, in accordance with an embodiment of the invention. Aperture 80 is elongated along the fast dimension, meaning that the long axis of the aperture is perpendicular to the longitudinal axis of stripes 34. (In other words, the long axis of the aperture will be oriented vertically in the view shown in FIG. 1.)

Figure 4B:
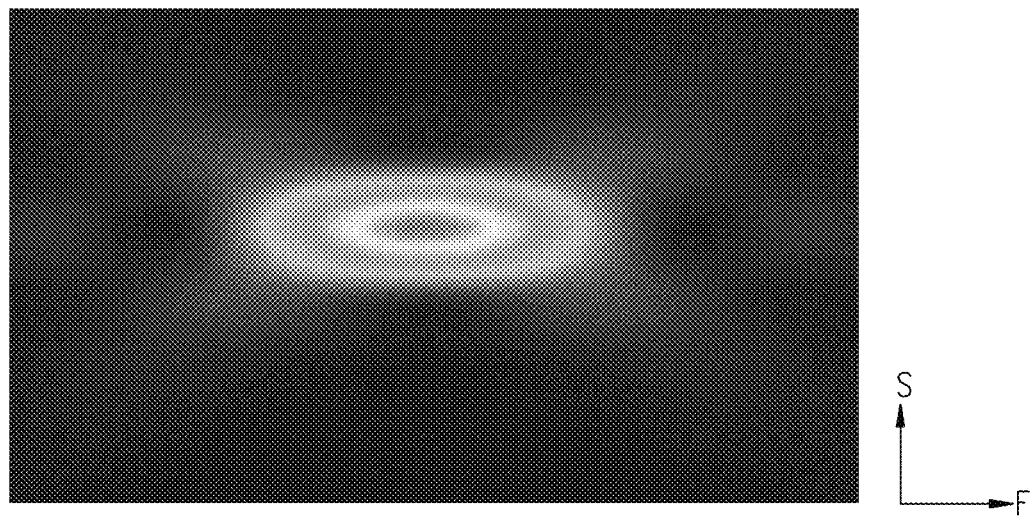
FIG. 4B is a schematic representation of the point spread function (PSF) of the lens of FIG. 4A.

FIG. 4B is a schematic representation of the point spread function (PSF) of lens 36, assuming that aperture 80 is shaped and oriented as shown in FIG. 4A. The narrower PSF in the slow dimension means that receiver 26 will have higher (finer) resolution in the slow dimension, while gathering light over a wider range in the fast dimension, with lower resolution. This model assumes that lens 36 is aberration-limited, as explained above. In the alternative, if lens 36 is designed for diffraction-limited performance, aperture 80 could be rotated by 90° to give the desired combination of high resolution in the slow dimension and wide collection range in the fast dimension.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
    a plurality of emitters arranged in a row and configured to emit respective beams of optical radiation;
    projection optics, which are configured to project the beams toward a target, and which comprise:
        first cylindrical lenses, which have respective, mutually-parallel first cylinder axes and are aligned respectively with the emitters in the row so as to receive and focus the respective beams in a first dimension; and
        a second cylindrical lens, which has a second cylinder axis perpendicular to the first cylinder axes and is positioned to receive and focus all of the beams in a second dimension, perpendicular to the first dimension; and
    a scan driver, which is configured to shift the second cylindrical lens in a direction perpendicular to the second cylinder axis so as to scan the beams across the target.

2. The apparatus according to claim 1, wherein the beams emitted by the emitters have an elliptical profile, with a major axis oriented parallel to the first cylinder axes, and wherein the first cylindrical lenses are positioned in proximity to the emitters, while the second cylindrical lens is positioned so as to receive the beams after the beams have passed through the first cylindrical lenses.

3. The apparatus according to claim 2, wherein the emitters comprise edge-emitting laser diodes.

4. The apparatus according to claim 1, wherein the projection optics comprise a beam deflector, which is configured to intercept the beams that have been focused by the first and second cylindrical lenses and to deflect the beams toward the target at different, respective angles.

5. The apparatus according to claim 4, wherein the beam deflector comprises a reflector having multiple facets, which are positioned to intercept respective ones of the beams and which are parallel to the second cylinder axis and oriented at different respective elevations relative to the first cylinder axes.

6. The apparatus according to claim 4, wherein the projection optics comprise a unidimensional beam expander, which is configured to expand each of the deflected beams along the first dimension so as to form a set of parallel stripes extending across the target at the different, respective angles.

7. The apparatus according to claim 6, wherein the unidimensional beam expander comprises a diffractive optical element (DOE).

8. The apparatus according to claim 6, wherein operation of the scan driver causes the stripes to scan together across the target along the second dimension.

9. The apparatus according to claim 6, and comprising a receiver, which comprises:
    an array of optical sensors; and
    objective optics, which are configured to image the target onto the array, and which have a non-circular aperture, which is elongated along the second dimension.

10. The apparatus according to claim 9, and comprising control circuitry, which is configured to generate a depth map of the target responsively to signals output by the array of optical sensors in response to reflection of the beams of optical radiation from the target.

11. The apparatus according to claim 1, and comprising:
    a detector, which is configured to receive a portion of at least one of the beams that has been focused by the first and second cylindrical lenses and to sense a position of the at least one of the beams; and
    control circuitry, which is configured to control the scan driver responsively to position sensed by the detector.

* * * * *